United States Patent
Kneckt et al.

(10) Patent No.: US 12,120,738 B2
(45) Date of Patent: Oct. 15, 2024

(54) MULTI-USER-RTS AND CTS FRAMES FOR A SUB-CHANNEL SELECTIVE TRANSMISSION STATION

(71) Applicant: Apple Inc., Cupertino, CA (US)

(72) Inventors: Jarkko L. Kneckt, Los Gatos, CA (US); Yong Liu, Campbell, CA (US); Jinjing Jiang, San Jose, CA (US); Tianyu Wu, Fremont, CA (US); Qi Wang, Sunnyvale, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 17/461,630

(22) Filed: Aug. 30, 2021

(65) Prior Publication Data

US 2022/0086910 A1   Mar. 17, 2022

Related U.S. Application Data

(60) Provisional application No. 63/077,476, filed on Sep. 11, 2020.

(51) Int. Cl.
*H04W 74/08* (2024.01)
*H04W 74/0816* (2024.01)

(52) U.S. Cl.
CPC .............. *H04W 74/0816* (2013.01)

(58) Field of Classification Search
CPC .................................. H04W 74/0816
See application file for complete search history.

(56) References Cited

U.S. PATENT DOCUMENTS

| 9,749,024 | B2 | 8/2017 | Huang et al. |
| 11,234,282 | B2 | 1/2022 | Patil et al. |
| 2015/0131517 | A1* | 5/2015 | Chu ............... H04L 5/0007 370/312 |
| 2016/0164652 | A1 | 6/2016 | Huang et al. |
| 2016/0164654 | A1* | 6/2016 | Huang ............ H04B 7/0452 370/392 |
| 2016/0360443 | A1* | 12/2016 | Hedayat ........ H04W 74/006 |
| 2019/0182863 | A1* | 6/2019 | Chu ................ H04W 76/00 |

(Continued)

OTHER PUBLICATIONS

Office Action for Indian Patent Application No. 202114038352; 6 pages; Mar. 30, 2022.

*Primary Examiner* — James P Duffy
(74) *Attorney, Agent, or Firm* — Kowert, Hood, Munyon, Rankin & Goetzel, P.C.

(57) ABSTRACT

During operation, an electronic device (e.g., an access point) may provide a multi-user (MU)-request-to-send (RTS) frame that communicates an RTS in a channel associated with the second electronic device and a second RTS in a second channel associated with a third electronic device. For example, the channel may include a primary channel and the second channel may include a secondary channel. Note that the third electronic device may include a SST station and the second electronic device may include a non-SST station. Then, the electronic device may receive an MU-clear-to-send (CTS) frame that includes a CTS in a third channel associated with the third electronic device. Moreover, the third channel may be equal to or a subset of the second channel, and/or the third channel may include a CTS reception channel associated with the electronic device.

21 Claims, 24 Drawing Sheets

(56) References Cited

U.S. PATENT DOCUMENTS

| | | | |
|---|---|---|---|
| 2019/0349930 A1* | 11/2019 | Chu | H04W 72/0453 |
| 2020/0288439 A1* | 9/2020 | Seok | H04L 5/0094 |
| 2021/0360521 A1 | 11/2021 | Seok et al. | |

\* cited by examiner

MULTI-USER-RTS AND CTS FRAMES FOR A SUB-CHANNEL SELECTIVE TRANSMISSION STATION

CROSS-REFERENCE TO RELATED APPLICATION

This application claims the benefit of U.S. Provisional Application No. 63/077,476, entitled "Low-Latency Communication in a WLAN," by Jarkko L. Kneckt, et al., filed Sep. 11, 2020, the contents of which are hereby incorporated by reference.

FIELD

The described embodiments relate, generally, to wireless communications among electronic devices, including techniques for using a multi-user (MU)-request-to-send (RTS) frame and an MU-clear-to-send (CTS) frame for sub-channel selective transmission (SST) stations in a wireless local area network (WLAN).

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi').

In IEEE 802.11ax, a station (which is sometimes referred to as a 'client' or a 'recipient electronic device') and an access point (which is sometimes referred to as an 'electronic device' or a 'transmitting electronic device') may set up an individual trigger-enable targeted wake-up time (TWT) agreement to schedule the times when the station operates in a sub-channel selective transmission (SST) mode. Notably, the TWT set-up may signal the secondary channels in which the station (which is sometimes referred to as an 'SST station') operates during the TWT service periods (SPs). Note that the SST station may not have a primary 20 MHz channel in a band of frequencies being used for communication.

Furthermore, an MU-RTS frame may trigger an MU-CTS-frame transmission from one or more stations. The MU-RTS frame may signal or indicate the channels in which the responding station(s) transmits an MU-CTS frame. However, in existing IEEE 802.11 standards, the channel allocation for MU-CTS transmission always includes the primary 20 MHz channel. Thus, the MU-RTS frame may not be transmitted to an SST station, and an MU-CT S frame may be provided if the whole channel is idle. These constraints may adversely impact communication performance in a WLAN.

SUMMARY

In a first group of embodiments, an electronic device that provides an MU-RTS frame is described. This electronic device includes: an antenna node that can communicatively couple to an antenna; and an interface circuit that communicates with a second electronic device and a third electronic device. During operation, the interface circuit provides the MU-RTS frame that communicates an RTS in a channel associated with the second electronic device and a second RTS in a second channel associated with the third electronic device. Note that the third electronic device includes an SST station and the second electronic device includes a non-SST station. Then, the interface circuit receives an MU-CTS frame that includes a CTS in a third channel associated with the third electronic device.

Moreover, the channel may include a primary channel and the second channel may include a secondary channel.

Furthermore, the third channel may be equal to or a subset of the second channel. Additionally, the third channel may be different from and/or may not overlap the channel.

In some embodiments, the second channel may include a packet detection channel associated with the third electronic device, and the third channel may include a CTS reception channel associated with the electronic device.

Note that the electronic device may include an access point.

Moreover, the electronic device may be compatible with an IEEE 802.11be standard or an IEEE 802.11 standard subsequent to IEEE 802.11be.

Furthermore, the MU-RTS frame may include a user-information field specific to the third electronic device.

Additionally, the MU-RTS frame may specify a format type of the CTS. For example, the format type may include an extended-CTS (E-CTS).

In some embodiments, the interface circuit may provide a beacon frame with information specifying a broadcast TWT with SPs associated with at least the third electronic device. For example, the information may specify when RTS-CTS signaling is used prior to an uplink transmission associated with the third electronic device, or that specifies when the uplink transmission is triggered by the electronic device.

Moreover, the interface circuit may provide a frame addressed to the third electronic device based at least in part on the CTS in the MU-CTS frame.

Other embodiments provide the second electronic device that performs counterpart operations to at least some of the operations performed by the electronic device.

Other embodiments provide the third electronic device that performs counterpart operations to at least some of the operations performed by the electronic device.

Other embodiments provide an integrated circuit (which is sometimes referred to as a 'communication circuit') for use with the electronic device, the second electronic device or the third electronic device. The integrated circuit may perform at least some of the aforementioned operations.

Other embodiments provide a computer-readable storage medium for use with the electronic device, the second electronic device or the third electronic device. When program instructions stored in the computer-readable storage medium are executed by the electronic device, the second electronic device or the third electronic device, the program instructions may cause the electronic device, the second electronic device or the third electronic device to perform at least some of the aforementioned operations of the electronic device, the second electronic device or the third electronic device.

Other embodiments provide a method. The method includes at least some of the aforementioned operations performed by the electronic device, the second electronic device or the third electronic device.

In a second group of embodiments, an electronic device that provides an MU-RTS frame is described. This electronic device includes: an antenna node that can communicatively couple to an antenna; and an interface circuit that communicates with a second electronic device. During operation, the interface circuit provides the MU-RTS frame, where the MU-RTS frame includes an RTS in a packet detection channel associated with the second electronic device, and the second electronic device includes an SST station. Then, the interface circuit receives an MU-CTS frame, where the MU-CTS frame includes a CTS in a second channel associated with the second electronic device.

Other embodiments provide the second electronic device that performs counterpart operations to at least some of the operations performed by the electronic device.

Other embodiments provide an integrated circuit (which is sometimes referred to as a 'communication circuit') for use with the electronic device or the electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

In a third group of embodiments, an electronic device that provides a beacon frame is described. This electronic device includes: an antenna node that can communicatively couple to an antenna; and an interface circuit that communicates with a second electronic device. During operation, the interface circuit provides the beacon frame with information specifying a broadcast TWT with SPs associated with the second electronic device, where the second electronic device includes an SST station.

Other embodiments provide the second electronic device that performs counterpart operations to at least some of the operations performed by the electronic device.

Other embodiments provide an integrated circuit (which is sometimes referred to as a 'communication circuit') for use with the electronic device or the electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
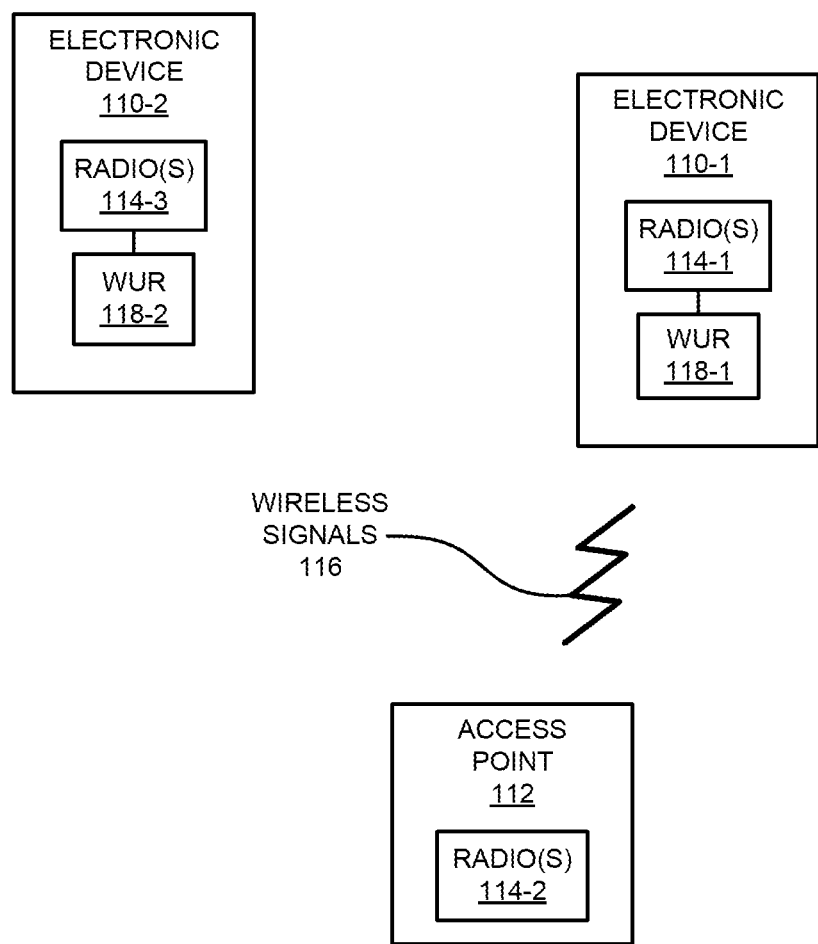
FIG. 1 illustrates an example network environment for communication between electronic devices according to some embodiments of the disclosure.

Some embodiments include an electronic device (e.g., an access point) that provides an MU-RTS frame. During operation, the electronic device may provide the MU-RTS frame that communicates an RTS in a channel associated with the second electronic device and a second RTS in a second channel associated with a third electronic device. For example, the channel may include a primary channel, the second channel may include a secondary channel, and/or the second channel may include a packet detection channel associated with the third electronic device. Note that the third electronic device may include an SST station and the second electronic device may include a non-SST station. Then, the electronic device may receive an MU-CTS frame that includes a CTS in a third channel associated with the third electronic device. Moreover, the third channel may be equal to or a subset of the second channel, and/or the third channel may include a CTS reception channel associated with the electronic device.

By providing the MU-RTS frame, these communication techniques may improve communication performance in a WLAN that includes the second electronic device and the third electronic device. Moreover, the communication techniques may increase flexibility when communicating in the WLAN. Notably, the communication techniques may allow an MU-RTS frame to be transmitted to an SST station, the SST station may be able to respond to the MU-RTS frame, and an MU-CTS frame may be provided even when the whole channel is not idle. Furthermore, the MU-RTS may concurrently communicate RTS frames to a non-SST station and an SST station. Consequently, the communication techniques may improve the user experience and customer satisfaction when using the electronic device, the second electronic device and/or the third electronic device.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, California) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have one or more connections with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 27:
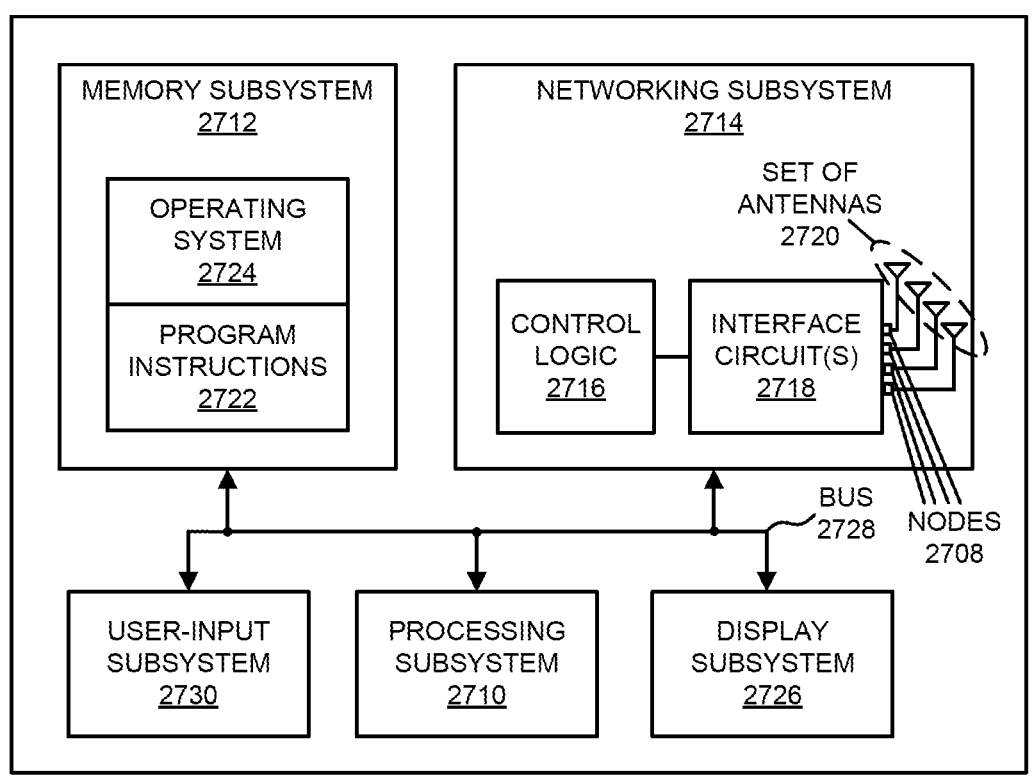
FIG. 27 illustrates an example of an electronic device of FIG. 1 according to some embodiments of the disclosure.

As described further below with reference to FIG. 27, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-26, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

As discussed previously, existing IEEE 802.11 standards may be inflexible. For example, the existing IEEE 802.11 standards may not allow an MU-RTS frame to be transmitted to an SST station, and an MU-CTS frame may only be provided when the whole channel is idle.

In order to address these challenges, as described below with reference to FIGS. 2-26, in some embodiments of the disclosed communication techniques access point 112 may provide an MU-RTS frame to electronic devices 110-1 and 110-2. This MU-RTS frame may communicate an RTS to electronic device 110-1 in a channel (such as a primary channel) associated with electronic device 110-1 and a second RTS in a second channel (such as a secondary channel) associated with electronic device 110-2. Note that electronic device 110-1 may include a non-SST station and electronic device 110-2 may include an SST station. In response, electronic device 110-2 may provide a CTS in a third channel associated with electronic device 110-2 in an MU-CTS frame to access point 112. This third channel may be equal to or a subset of the second channel. In some embodiments, the third channel may be different from and/or may not overlap the channel. Moreover, access point 112 may provide a frame addressed to electronic device 110-2 based at least in part on the CTS in the MU-CTS frame.

Note that the second channel may include a packet detection channel associated with the third electronic device, and the third channel may include a CTS reception channel associated with the electronic device.

Furthermore, access point 112 may provide a beacon frame with information specifying a broadcast TWT with SPs associated with at least electronic device 110-2. For example, the information may specify when RTS-CTS signaling is used prior to an uplink transmission associated with electronic device 110-2, or when the uplink transmission is triggered by access point 112.

In summary, the communication techniques may improve communication performance during communication between the electronic device and the second electronic device and/or the third electronic device. For example, the communication techniques may increase flexibility when communicating in the WLAN. Notably, the communication techniques may allow an MU-RTS frame to be transmitted to an SST station (such as electronic device 110-2), the SST station may be able to respond to the MU-RTS frame, and an MU-CTS frame may be provided even when the whole channel is not idle. Furthermore, the MU-RTS may concurrently communicate RTS frames to a non-SST station (such as electronic device 110-1) and an SST station.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments (BAs) to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110 and/or 112. Consequently, one of electronic devices 110 and/or 112 may perform operations in the communication techniques.

Figure 2:
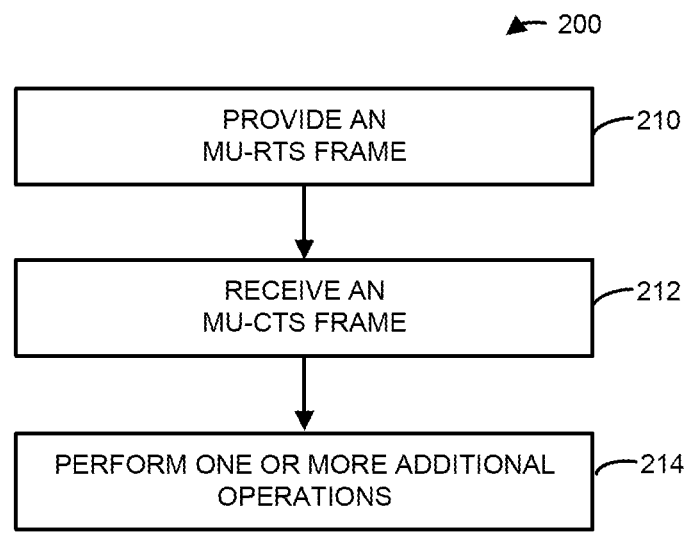
FIG. 2 illustrates an example method for providing a multi-user (MU)-request-to-send (RTS) frame according to some embodiments of the disclosure.

FIG. 2 presents a flow diagram illustrating an example method 200 for providing an MU-RTS frame. This method may be performed by an electronic device, such as access point 112 in FIG. 1. Note that the communication with a second electronic device and a third electronic device may be compatible with an IEEE 802.11 communication protocol.

During operation, the electronic device may provide the MU-RTS frame (operation 210), where the MU-RTS frame communicates an RTS in a channel associated with the second electronic device and a second RTS in a second channel associated with the third electronic device. Note that the second electronic device includes a non-SST station and the third electronic device includes an SST station.

Then, the electronic device may receive an MU-CTS frame (operation 212), where the MU-CTS frame includes a CTS in a third channel associated with the third electronic device.

Moreover, the channel may include a primary channel and the second channel may include a secondary channel. Furthermore, the third channel may be equal to or a subset of the second channel. Additionally, the third channel may be different from and/or may not overlap the channel. In some embodiments, the second channel may include a packet detection channel associated with the third electronic device, and the third channel may include a CTS reception channel associated with the electronic device.

In some embodiments, the MU-RTS frame may include a user-information field specific to the third electronic device. Moreover, the MU-RTS frame may specify a format type of the CTS. For example, the format type may include an E-CTS.

In some embodiments, the electronic device optionally performs one or more additional operations (operation 214). For example, the electronic device may provide a beacon frame with information specifying a broadcast TWT with SPs associated with at least the third electronic device. This information may specify when RTS-CTS signaling is used prior to an uplink transmission associated with the third electronic device, or when the uplink transmission is triggered by the electronic device.

Moreover, the electronic device may provide a frame addressed to the third electronic device based at least in part on the CTS in the MU-CTS frame.

Figure 3:
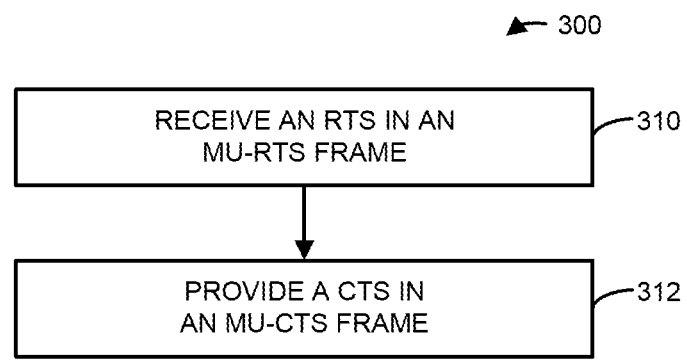
FIG. 3 illustrates an example method for receiving an RTS in an MU-RTS frame according to some embodiments of the disclosure.

FIG. 3 presents a flow diagram illustrating an example method 300 for receiving an RTS in an MU-RTS frame. This method may be performed by the third electronic device, such as electronic device 110-2 in FIG. 1. Note that the communication with the electronic device may be compatible with an IEEE 802.11 communication protocol.

During operation, the third electronic device may receive the RTS (operation 310) in a second channel associated with the third electronic device in the MU-RTS frame, where the MU-RTS frame is associated with (or from) the electronic device, and the MU-RTS includes a second RTS in a channel associated with the second electronic device. Then, the third electronic device may provide a CTS (operation 312) in a third channel associated with the third electronic device in an MU-CTS frame.

Figure 4:
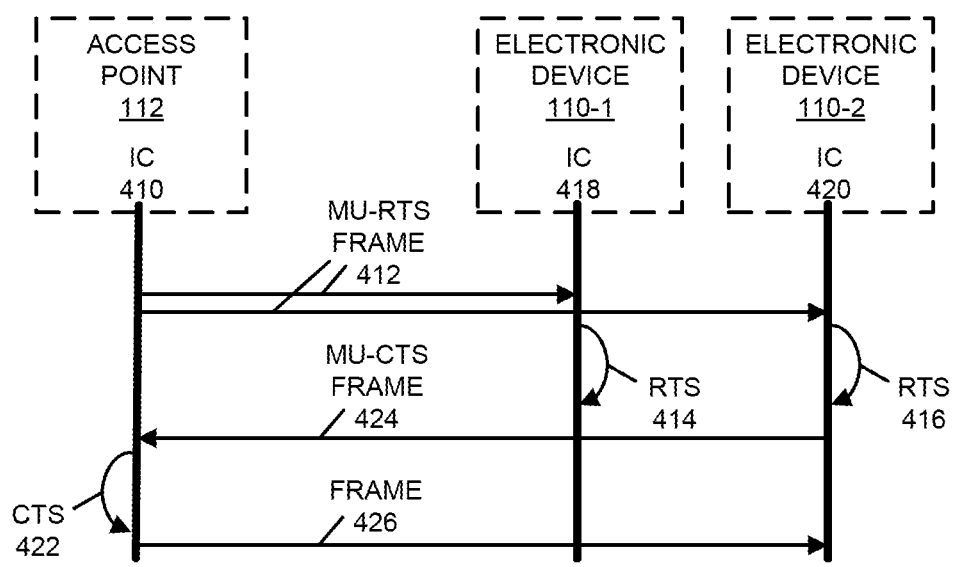
FIG. 4 illustrates an example of communication among components, e.g., in the electronic devices of FIG. 1 according to some embodiments of the disclosure.

The communication techniques are further illustrated in FIG. 4, which presents a flow diagram illustrating an example of communication among components in electronic device 110-1, electronic device 110-2 and access point 112. During operation, an interface circuit (IC) 410 in access point 112 may provide an MU-RTS frame 412, where MU-RTS frame 412 may communicate an RTS 414 to electronic device 110-1 in the channel associated with electronic device 110-1 and an RTS 416 in the second channel associated with electronic device 110-2.

An interface circuit 418 in electronic device 110-1 may receive RTS 414 in MU-RTS frame 412 and an interface circuit 420 in electronic device 110-2 may receive RTS 416 in MU-RTS frame 412. Then, interface circuit 420 may provide a CTS 422 in a third channel associated with electronic device 110-2 in an MU-CTS 424. Moreover, after receiving CTS 422 in MU-CTS 424, interface circuit 410 may provide a frame 426 addressed to electronic device 110-2, which may be received by interface circuit 420.

Figure 5:
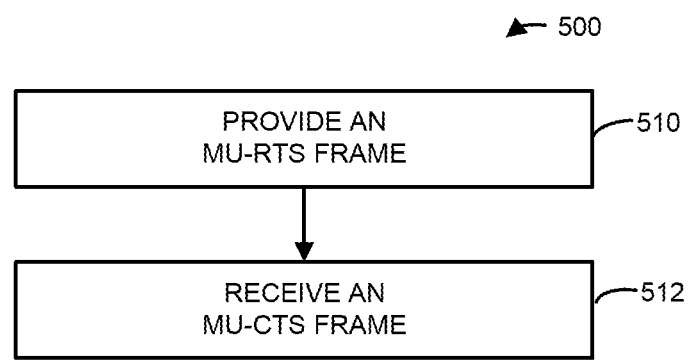
FIG. 5 illustrates an example method for providing an MU-RTS frame according to some embodiments of the disclosure.

FIG. 5 presents a flow diagram illustrating an example method 500 for providing an MU-RTS frame. This method may be performed by an electronic device, such as access point 112 in FIG. 1. Note that the communication with a second electronic device may be compatible with an IEEE 802.11 communication protocol.

During operation, the electronic device may provide the MU-RTS frame (operation 510), where the MU-RTS frame includes an RTS in a packet detection channel associated with a second electronic device, and the second electronic device includes an SST station. Then, the electronic device may receive an MU-CTS frame (operation 512), where the MU-CTS frame includes a CTS in a second channel associated with the second electronic device.

Figure 6:
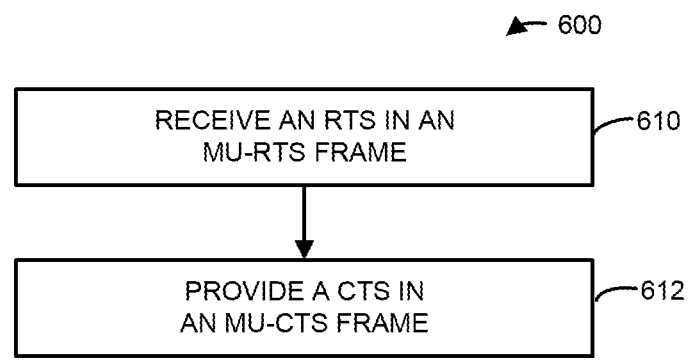
FIG. 6 illustrates an example method for receiving an RTS in an MU-RTS frame according to some embodiments of the disclosure.

FIG. 6 presents a flow diagram illustrating an example method 600 for receiving an RTS in an MU-RTS frame. This method may be performed by a second electronic device, such as electronic device 110-2 in FIG. 1. Note that the communication with an electronic device may be compatible with an IEEE 802.11 communication protocol.

During operation, the second electronic device may receive the RTS (operation 610) in the MU-RTS frame, where the MU-RTS frame includes the RTS in a packet detection channel associated with the second electronic device, and the second electronic device includes an SST station. Then, the second electronic device may provide a CTS (operation 612) in a second channel associated with the second electronic device in an MU-CTS.

Figure 7:
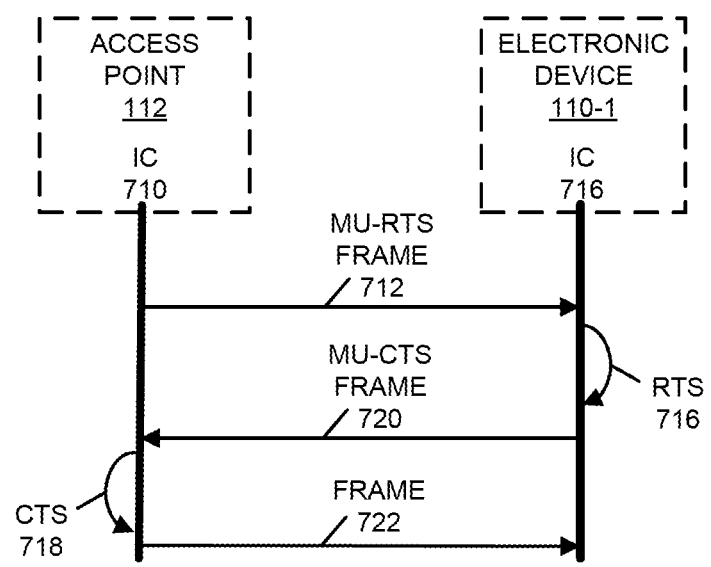
FIG. 7 illustrates an example of communication among components, e.g., in the electronic devices of FIG. 1 according to some embodiments of the disclosure.

The communication techniques are further illustrated in FIG. 7, which presents a flow diagram illustrating an example of communication among components in electronic device 110-2 and access point 112. During operation, an interface circuit (IC) 710 in access point 112 may provide an MU-RTS frame 712, where MU-RTS frame 712 may include an RTS 714 in a packet detection channel associated with electronic device 110-2.

After receiving RTS 714 in MU-RTS frame 712, an interface circuit 716 in electronic device 110-2 may provide a CTS 718 in a second channel associated with electronic device 110-2 in an MU-CTS frame 720. Moreover, after receiving CTS 718 in MU-CTS frame 720, interface circuit 710 may provide a frame 722 addressed to electronic device 110-2, which may be received by interface circuit 716.

Figure 8:
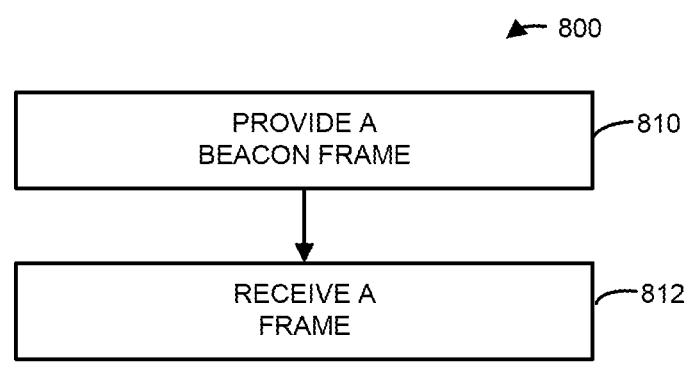
FIG. 8 illustrates an example method for providing a beacon frame according to some embodiments of the disclosure.

FIG. 8 presents a flow diagram illustrating an example method 800 for providing a beacon frame. This method may be performed by an electronic device, such as access point 112 in FIG. 1. Note that the communication with a second electronic device may be compatible with an IEEE 802.11 communication protocol.

During operation, the electronic device may provide the beacon frame (operation 810) with information specifying a broadcast TWT with SPs associated with the second electronic device, where the second electronic device includes an SST station. Then, the electronic device may receive a frame (operation 812) associated with (or from) the second electronic device during a given SP in the TWT.

Figure 9:
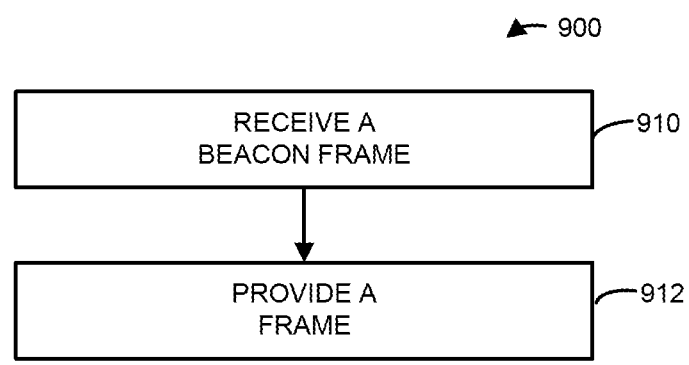
FIG. 9 illustrates an example method for receiving a beacon frame according to some embodiments of the disclosure.

FIG. 9 presents a flow diagram illustrating an example method 900 for receiving a beacon frame. This method may be performed by a second electronic device, such as electronic device 110-2 in FIG. 1. Note that the communication with an electronic device may be compatible with an IEEE 802.11 communication protocol.

During operation, the second electronic device may receive the beacon frame (operation 910) with information specifying a broadcast TWT with SPs associated with the second electronic device, where the second electronic device includes an SST station. Then, the second electronic device may provide a frame (operation 912) addressed to the electronic device during a given SP in the TWT.

In some embodiments of method 200 (FIG. 2), 300 (FIG. 3), 500 (FIG. 5), 600 (FIG. 6), 800 (FIG. 8), and/or 900, as well as in some or all of the figures below, there may be additional or fewer operations. Further, one or more different operations may be included. Moreover, the order of the operations may be changed, and/or two or more operations may be combined into a single operation or performed at least partially in parallel.

Figure 10:
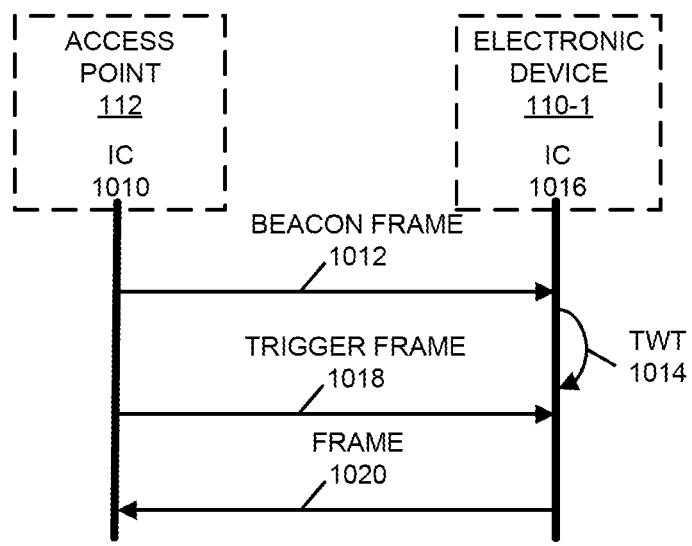
FIG. 10 illustrates an example of communication among components, e.g., in the electronic devices of FIG. 1 according to some embodiments of the disclosure.

The communication techniques are further illustrated in FIG. 10, which presents a flow diagram illustrating an example of communication among components in electronic device 110-2 and access point 112. During operation, an interface circuit (IC) 1010 may provide a beacon frame 1012 with information specifying a broadcast TWT 1014 with SPs associated with electronic device 110-2. Interface circuit 1016 in electronic device 110-2 may receive beacon frame 1012 and may extract TWT 1014.

Then, interface circuit 1010 may provide a trigger frame 1018 to electronic device 110-2, such as during a given SP in TWT 1014. After receiving trigger frame 1018, interface circuit 1016 may provide a frame 1020 addressed to access point 112 during a given SP in TWT 1014. This frame may be received by interface circuit 1010.

While communication between the components in FIGS. 4, 7 and 10 are illustrated with unilateral or bilateral communication (e.g., lines having a single arrow or dual arrows), in general a given communication operation may be unilateral or bilateral.

Figure 11:
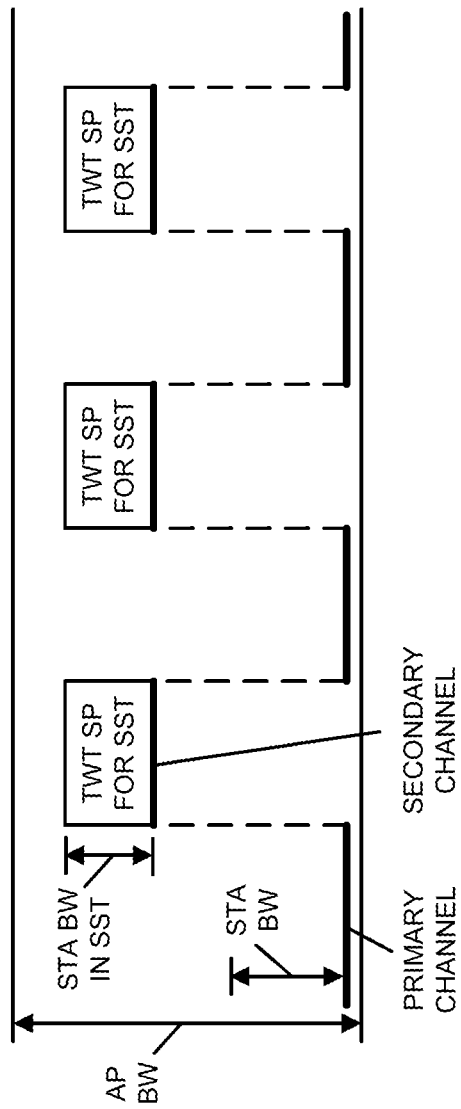
FIG. 11 illustrates an example of operation of a sub-channel selective transmission (SST) station according to some embodiments of the disclosure.
Figure 12:
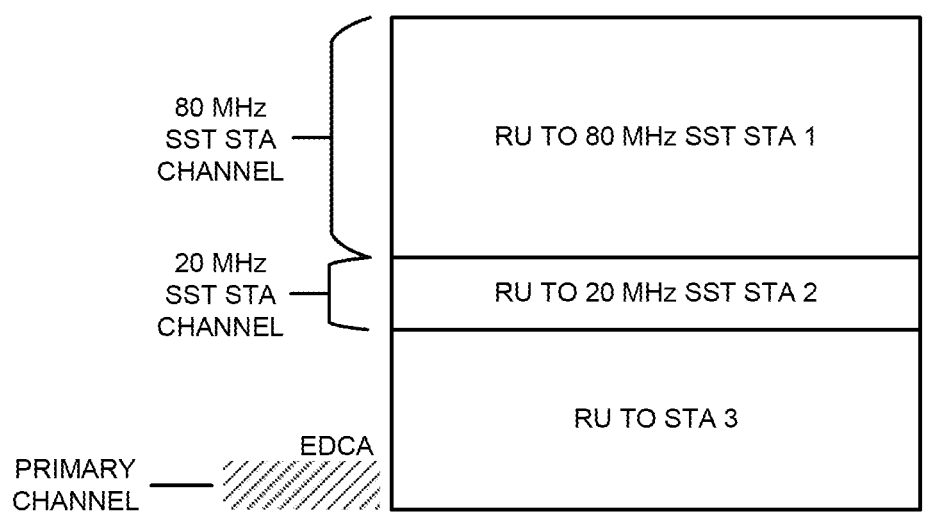
FIG. 12 illustrates an example of operating channels of SST and non-SST stations according to some embodiments of the disclosure.

We now further discuss the communication techniques. As shown in FIG. 11, which presents an example of operation of an SST station (STA), in IEEE 802.11ax a station and an access point (AP) may set up an individual trigger-enable TWT agreement to schedule the times when the station operates in SST mode. Notably, the TWT set-up may signal the secondary channels within the access-point bandwidth (BW) in which the station operates during the TWT SPs. Otherwise, the station may operate in the primary channel Moreover, FIG. 12 presents an example of operating channels of SST and non-SST stations. Note that an SST station may have a fixed 20 or 80 MHz operating bandwidth (which is sometimes referred to as a 'resource unit' or RU) during the TWT SP. Furthermore, a 20 MHz SST station may operate in any secondary channel. Note that the physical layer convergence protocol (PLCP) protocol data unit (PPDU) reception rules are similar to those for the primary 20 MHz channel. Additionally, an 80 MHz SST station may operate in the secondary 80 MHz channel. The 80 MHz SST station may not have a primary channel. In some embodiments, the SST station may receive high-efficiency (HE) MU and non-high throughput (HT) duplicate PPDUs that are transmitted over the whole 80 MHz channel. However, it is not clear whether the 80 MHz SST station can receive punctured PPDUs or PPDUs with smaller overlap.

Figure 13:
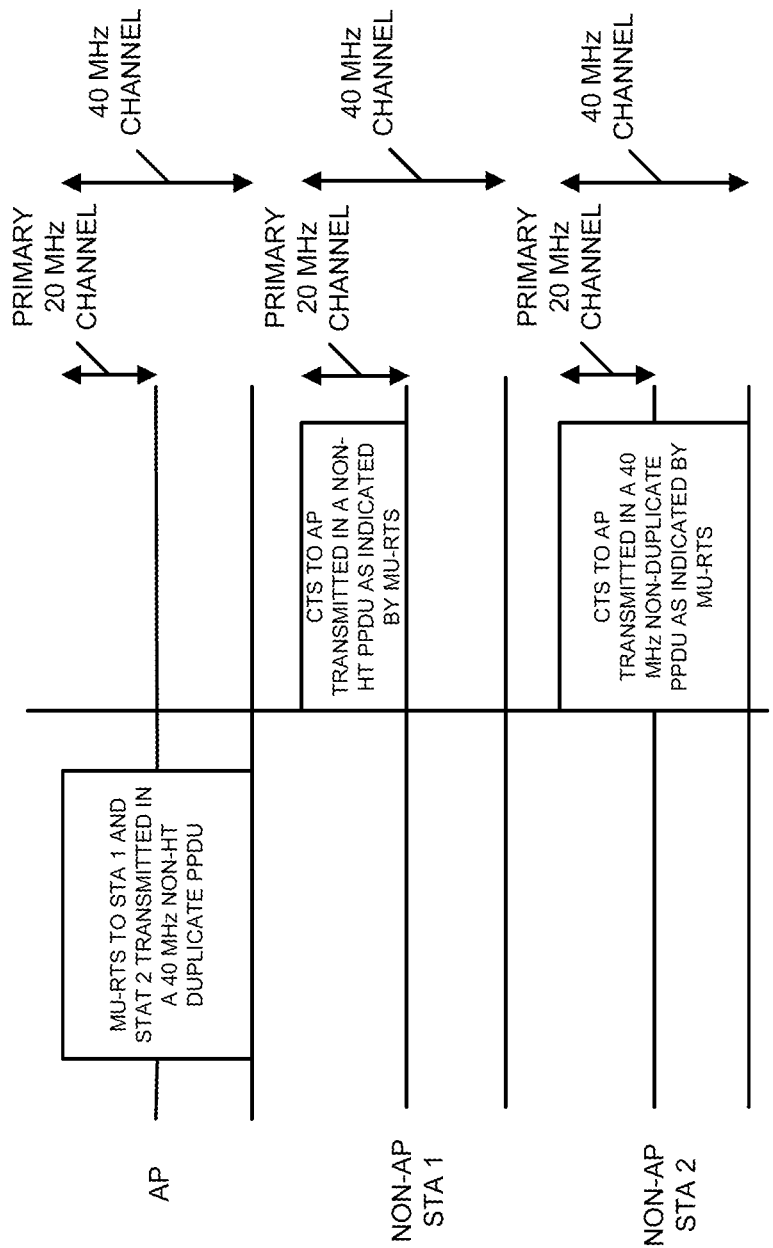
FIG. 13 illustrates an example of an MU-RTS frame triggering transmission of an MU-clear-to-send (CTS) frame according to some embodiments of the disclosure.
Figure 14:
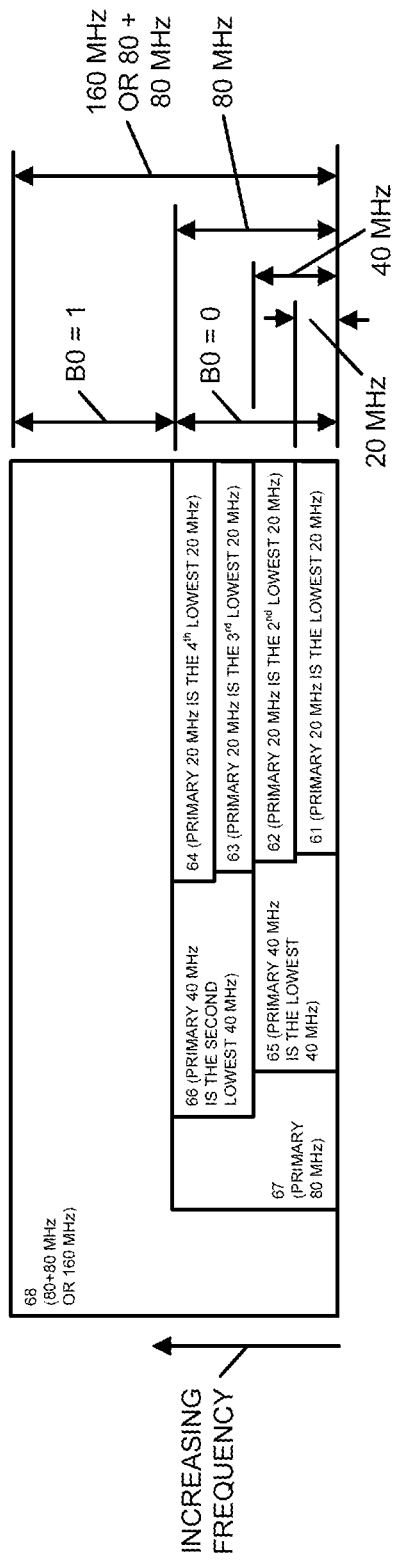
FIG. 14 illustrates an example of an MU-RTS frame signaling channels in which a station transmits a CTS frame according to some embodiments of the disclosure.

FIG. 13 presents an example of an MU-RTS frame triggering transmission of a CTS frame in IEEE 802.11ax. Notably, an MU-RTS frame may trigger an MU-CTS-frame transmission from one or more stations. The MU-RTS frame may signal or indicate the channels in which the responding station(s) transmits an MU-CTS frame. Moreover, as shown in FIG. 14, which presents an example of an MU-RTS frame signaling channels in which a station transmits a CTS frame, the channel allocation for MU-CTS transmission always includes the primary 20 MHz channel. Thus, the MU-RTS frame may not be transmitted to an SST station, and an MU-CTS frame may be provided if the whole channel is idle. Note that FIG. 14 shows the uplink bandwidth subfield indication bytes 1-7 of the resource-unit allocation subfield in the MU-RTS trigger frame.

Figure 15:
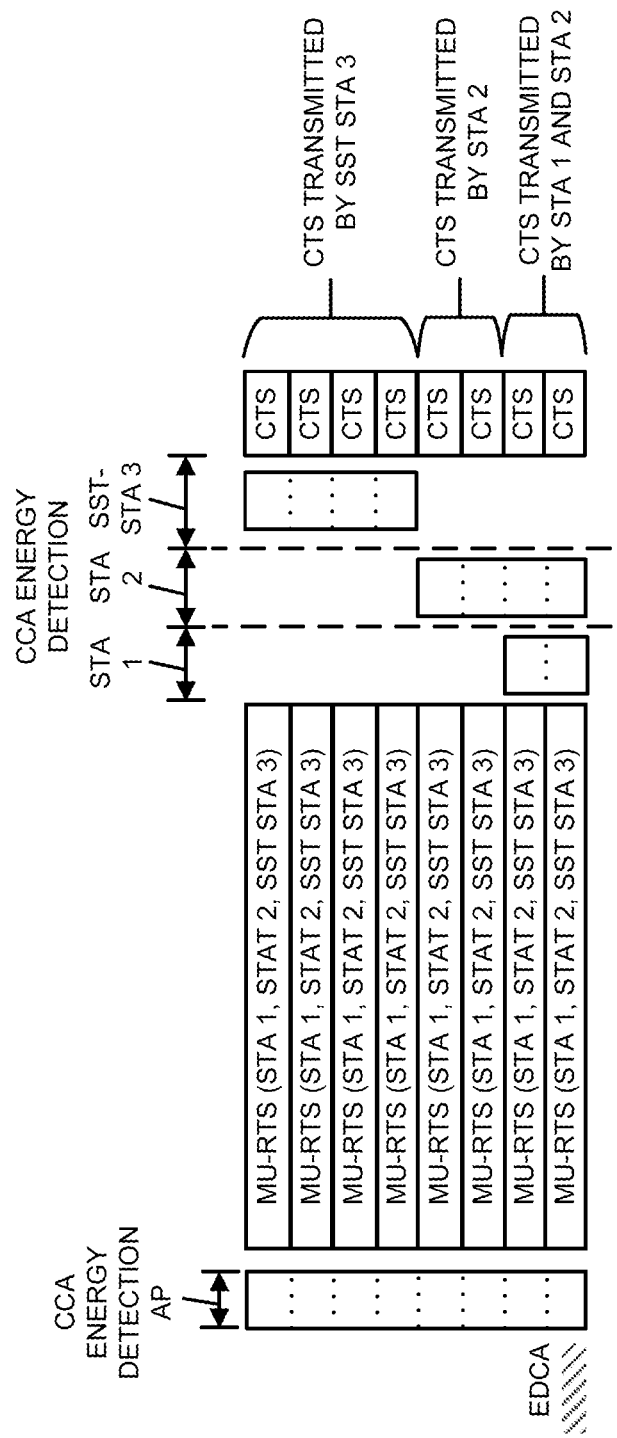
FIG. 15 illustrates an example of exchange of MU-RTS and MU-CTS frames according to some embodiments of the disclosure.

As shown in FIG. 15, which presents an example of exchange of MU-RTS and MU-CTS frames, in the disclosed communication techniques MU-RTS and MU-CTS frames may be exchanged with an extremely high throughput (EHT) SST station. Notably, an access point may send the MU-RTS frame on the primary channel. Additionally, the MU-RTS frame may include at least one associated non-SST station to respond at the primary channel (such as station 1 or STA 1). Note that the MU-CTS frame may be transmitted to the 20 MHz channels in which the MU-RTS frame is transmitted. Moreover, not that the access point and the stations may sense that the clear channel assessment (CCA) are idle during the point coordination function interframe space (PIFS) in FIG. 15. (In the examples described further below with reference to FIGS. 16, 17, 19 and 21-23, the sensed CCAs are idle unless indicated otherwise.)

However, the MU-RTS frame may also be sent to an SST station (such as STA 2) on a channel(s) that operates outside of the operating bandwidth of the non-SST station (e.g., STA 1). The access point may use a transmit opportunity (TXOP) to transmit to the SST station if the SST station responds to the MU-RTS frame in an MU-CTS frame.

Figure 16:
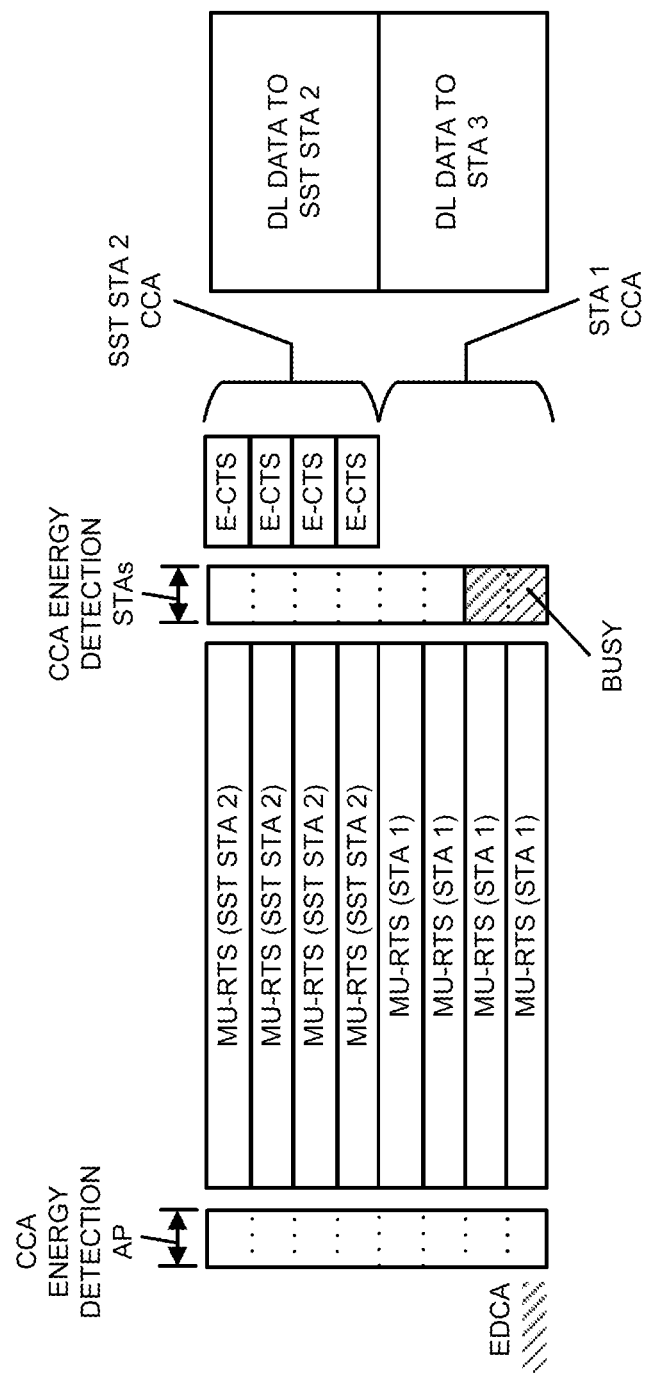
FIG. 16 illustrates an example of exchange of MU-RTS and MU-CTS frames according to some embodiments of the disclosure.
Figure 17:
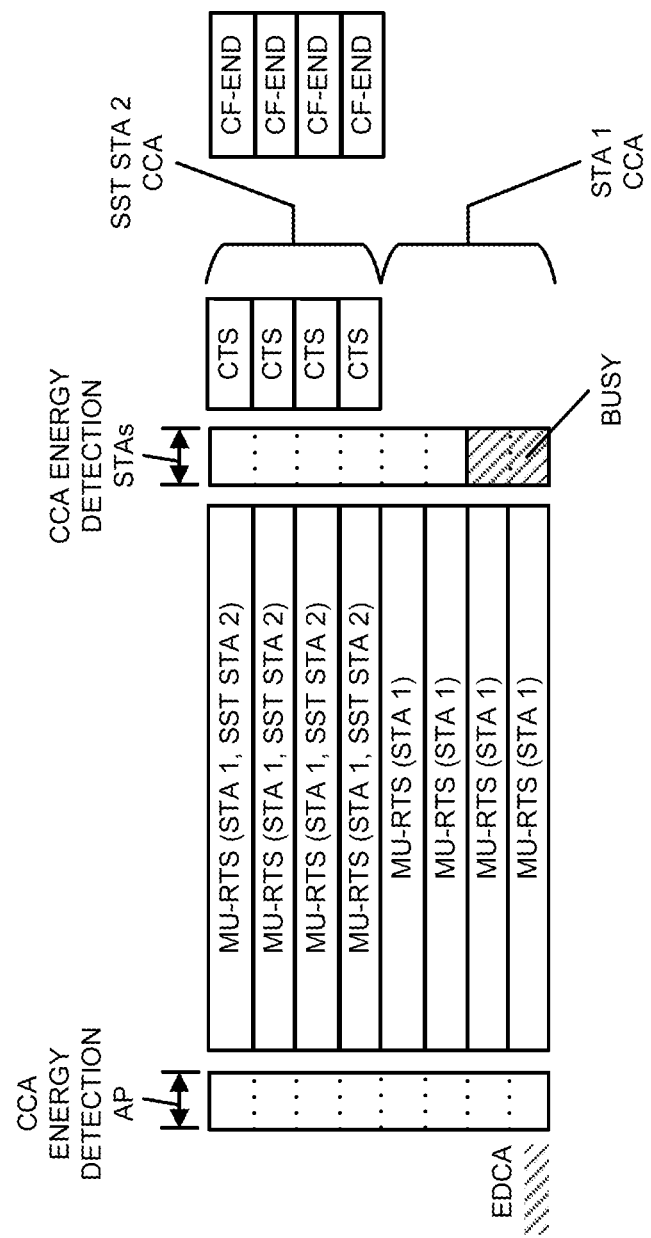
FIG. 17 illustrates an example of exchange of MU-RTS and MU-CTS frames according to some embodiments of the disclosure.

Moreover, as shown in FIG. 16, which presents an example of exchange of MU-RTS and MU-CTS frames, the access point may only receive an MU-CTS frame from SST stations on secondary channels. If the access point senses CCA idle on the primary channel, the access point may transmit to another station to keep the primary channel busy. This may ensure that other stations in primary channel cannot transmit to access point. Alternatively, as shown in FIG. 17, which presents an example of exchange of MU-RTS and MU-CTS frames, if the access point senses CCA busy on the primary channel, then the access point may: send PPDUs to one or more SST stations from which it received an MU-CTS frame on one or more of the secondary channels; or cancel the TXOP by sending a contention-free (CF)-End frame on the one or more secondary channels in which it received an MU-CTS frame. For example, if STA 1 senses a channel is busy and does not respond to the MU-RTS frame, then, after the MU-CTS frame is received, the access point may sense that the primary channel is idle and may send downlink (DL) data to STA 3 and may send DL data to SST STA 2. Moreover, if STA 1 senses a channel is busy and does not respond to the MU-RTS frame, then, after the MU-CTS frame is received, the access point may send a CF-End frame to SST STA 2. Note that an MU-RTS frame can request a response from multiple stations (therefore, each 80 MHz channel can have a different copy or version of the MU-RTS frame) and, in general, different stations may respond independently to the MU-RTS frame.

Figure 18:
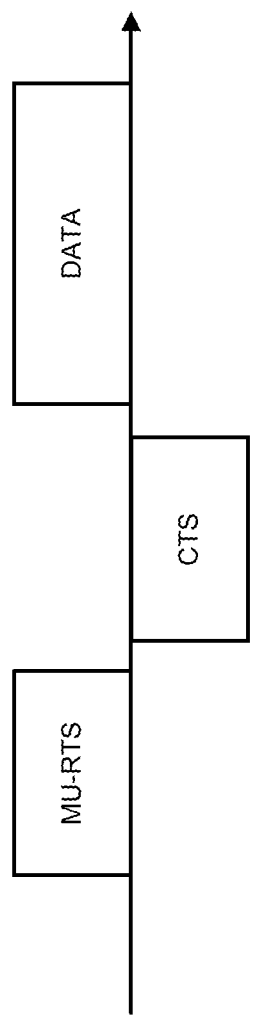
FIG. 18 illustrates an example of transmit protection during transmission to an SST station according to some embodiments of the disclosure.

Note that legacy IEEE 802.11a, IEEE 802.11b, IEEE 802.11g, IEEE 802.11n and IEEE 802.11ac stations do not recognize an MU-RTS frame. These stations will set the network allocation vector (NAV) for the duration of TXOP. The NAV prevents these stations from obtaining a TXOP to transmit to the access point. Moreover, the IEEE 802.11ax stations or EHT stations may be configured to initiate their uplink (UL) enhanced distributed channel access (EDCA) transmissions with RTS CTS signaling. This prevents these stations from suffering from the lack of an access point in the primary channel if the access point is transmitting to the SST station. FIG. 18, which presents an example of transmit protection during transmission to an SST station, illustrates NAV protection with an MU-RTS frame. In FIG. 18, the MU-RTS timeout may equal two times a short interframe space plus a CTS time, two times a slot time and a preamble duration.

Figure 19:
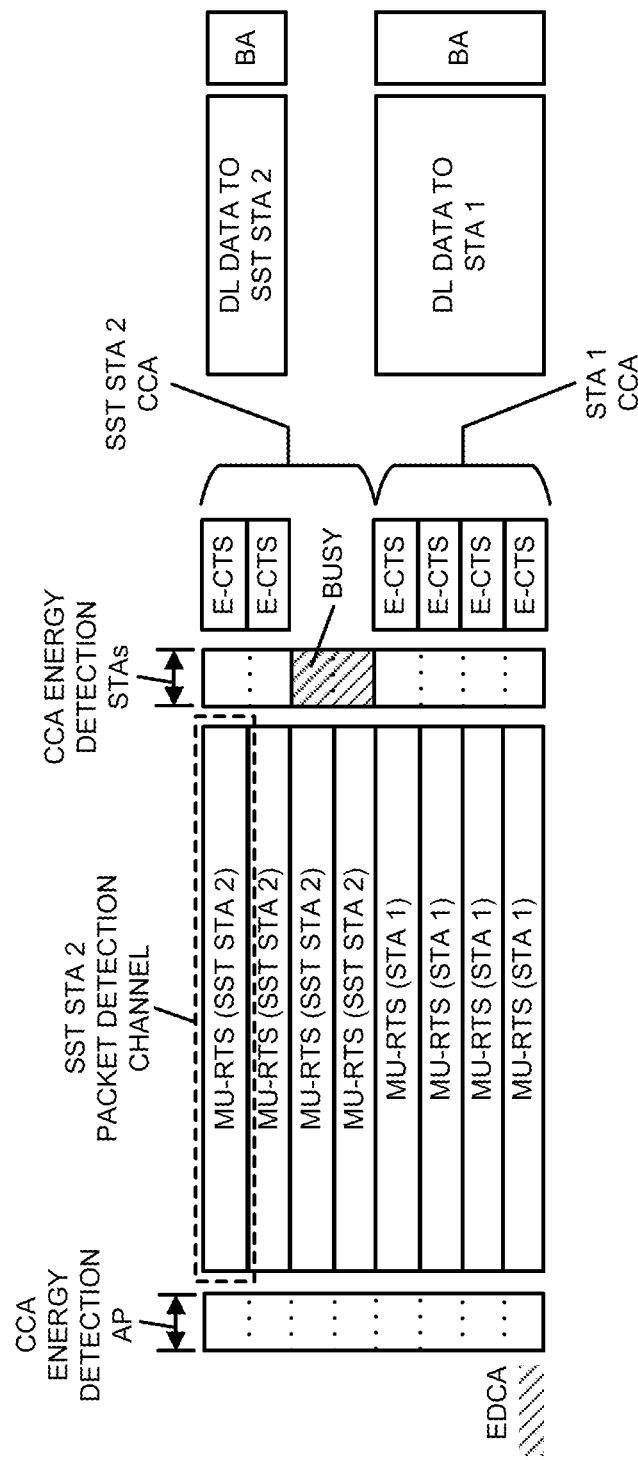
FIG. 19 illustrates an example of exchange of MU-RTS and MU-CTS frames according to some embodiments of the disclosure.

Furthermore, as shown in FIG. 19, which presents an example of exchange of MU-RTS and MU-CTS frames, in some embodiments the access point may provide the MU-RTS frame with a packet detection channel. Notably, an SST station may receive a PPDU if it is transmitted to the packet detection channel of the SST station. By using the packet detection channel, this MU-RTS frame may request an EDCA transmission from the SST station.

Then, the access point may receive an MU-CTS frame from the SST station if it transmitted to the CTS reception channel. Moreover, if a channel has a single responding station, the station may send an E-CTS frame to the access point. This E-CTS frame may signal or indicate the channels in which E-CTS frames are transmitted. Note that the access point may control the type of response frame (CTS or E-CTS) that is provided by the station. The response may be on all of the requested channels or only on the idle channels. In FIG. 19, after downlink data is communicated to the stations, a block acknowledgment (BA) may be communicated to the access point.

Figure 20:
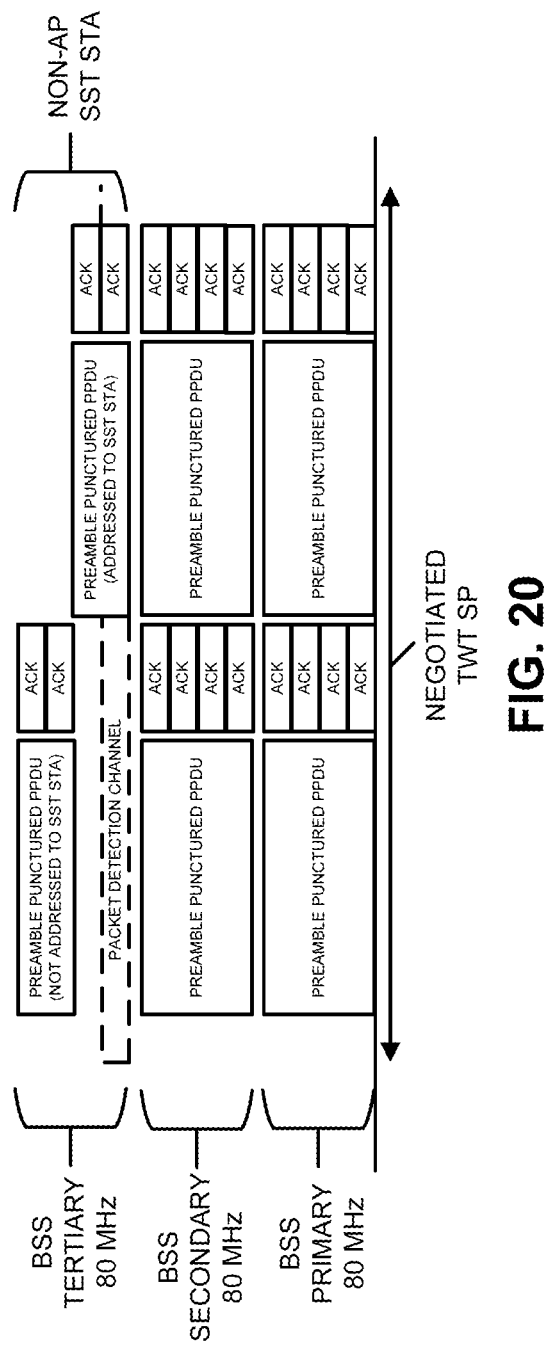
FIG. 20 illustrates an example of listening channels of an SST station according to some embodiments of the disclosure.
Figure 21:
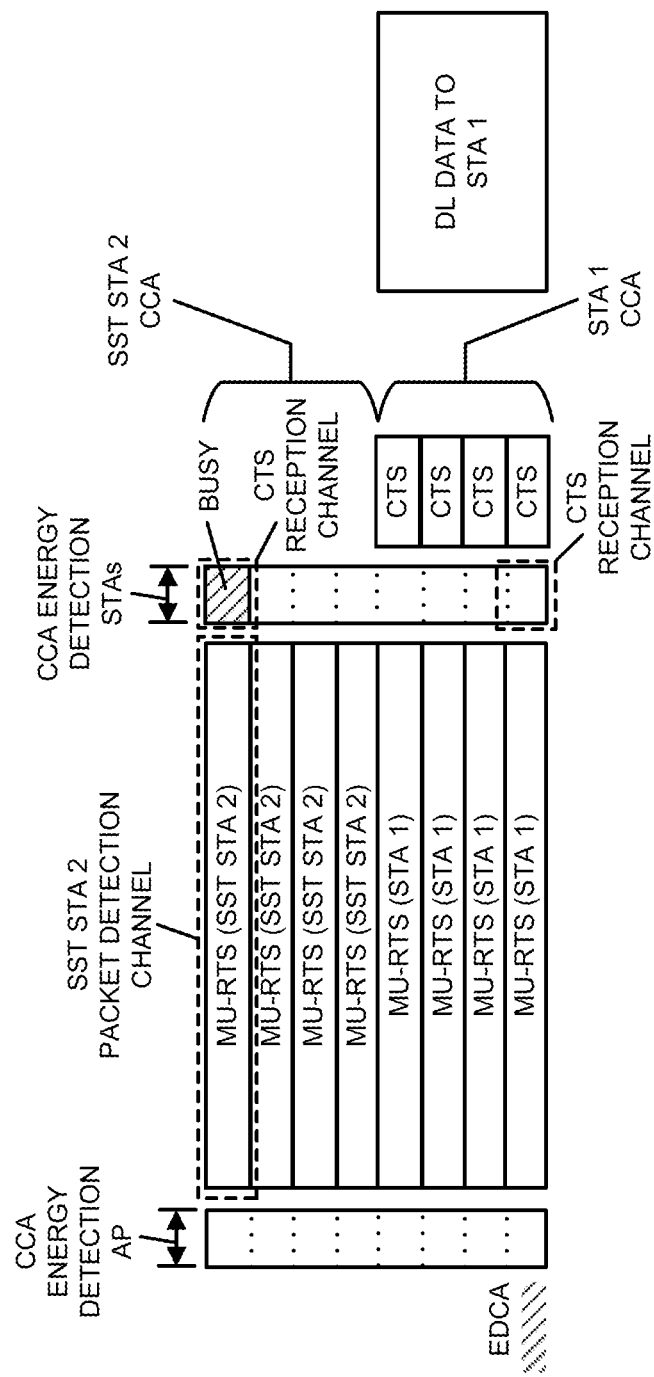
FIG. 21 illustrates an example of exchange of MU-RTS and MU-CTS frames according to some embodiments of the disclosure.

Additionally, as shown in FIG. 20, which presents an example of listening channels of an SST station, the packet detection channel of the SST STA may be a channel in which it detects PPDUs (similarly as with the primary 20 MHz channel). Moreover, as shown in FIG. 21, which presents an example of exchange of MU-RTS and MU-CTS frames, the access point may configure a channel in which it can receive CTS frame, and the SST station may respond with a CTS frame, if it can be transmitted to the CTS reception channel. By default, the packet detection channel and the CTS reception channel may be the same channel. Note that the TWT set-up or the MU-RTS frame may signal or indicate the channel(s) in which the access point can receive the CTS frame from the SST station(s). In some embodiments, the MU-RTS frame may use a dedicated user information field to carry the information. Thus, the access point may use the packet detection channel of the SST station to configure bandwidth on which the SST station is required to receive an MU-RTS frame and to respond with an MU-CTS frame.

Figure 22:
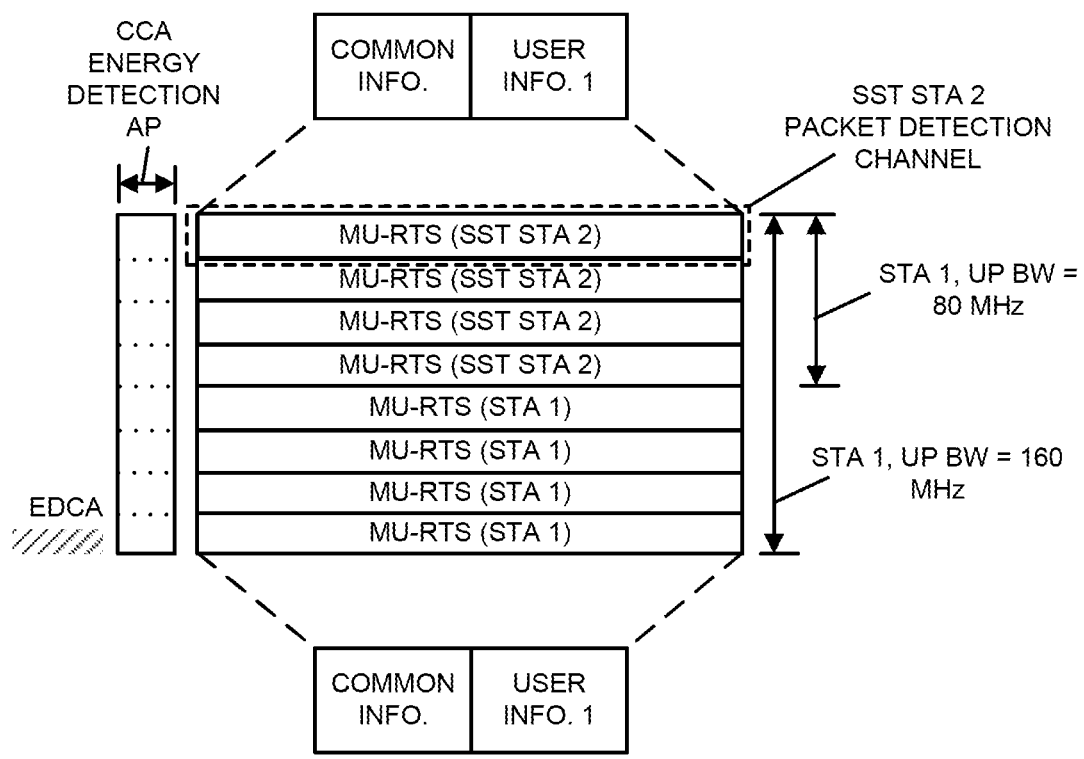
FIG. 22 illustrates an example of an MU-RTS frame according to some embodiments of the disclosure.

As shown in FIG. 22, which presents an example of an MU-RTS frame, the MU-RTS frame may use an UL bandwidth field to signal the channels in which the CTS frame is requested to be transmitted. The SST station may use the same values, and the packet detection channel may be the same as the primary channel. Additionally, the MU-RTS frame may signal or indicate whether the responder needs to allocate the full requested bandwidth, or whether a partial bandwidth allocation is allowed. The CTS frame may need to be transmitted on at least a 40 MHz channel, so that the access point is able to transmit on a punctured channel in S80, T80 or Q80. Alternatively, the CTS frame may be transmitted on any idle 20 MHz channels that is requested to be reserved. Note that the RTS in the first 20 MHz in the MU-RTS may include or may specify: the association identifier of STA 1, an uplink bandwidth of 68 (160 MHz), and CTS is transmitted on all channels. Moreover, the RTS in the last 20 MHz in the MU-RTS may include or may specify: the association identifier of SST STA 2, an uplink bandwidth of 64 (80 MHz), and CTS is transmitted on all channels.

Figure 23:
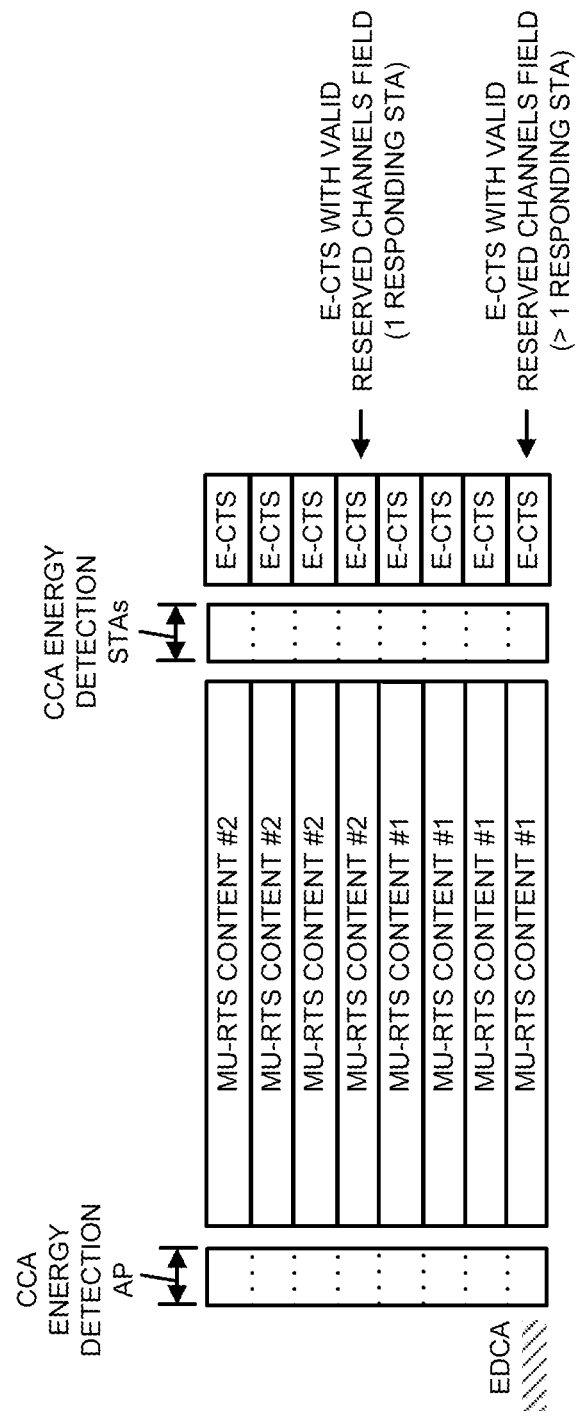
FIG. 23 illustrates an example of exchange of MU-RTS and MU-extended-CTS (E-CTS) frames according to some embodiments of the disclosure.
Figure 24:
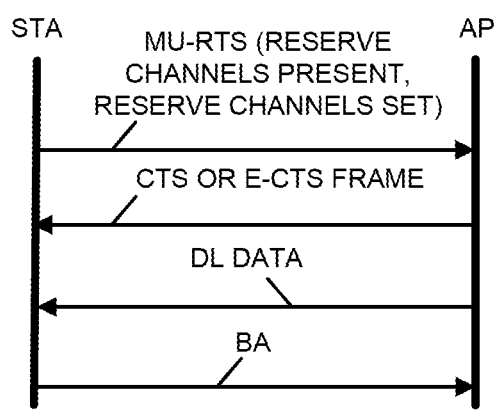
FIG. 24 illustrates an example of exchange of MU-RTS and MU-CTS or MU-E-CTS frames according to some embodiments of the disclosure.
Figure 25:
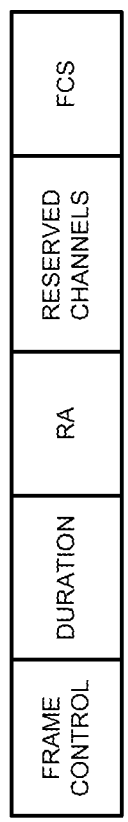
FIG. 25 illustrates an example of an E-CTS frame according to some embodiments of the disclosure.

The MU-RTS frame and the CTS response frame size and content is summarized in FIGS. 23-25. Notably, FIG. 23 presents an example of exchange of MU-RTS and MU-E-CTS frames, FIG. 24 presents an example of exchange of MU-RTS and MU-CTS or MU-E-CTS frames, and FIG. 25 presents an example of an E-CTS frame. In some embodiments, an E-CTS frame may include: a frame control subfield (such as two bytes), a duration subfield (such as two bytes), a receiver address or RA (such as six bytes), reserved channels (such as two bytes) and a frame check sequence or FCS (such as two bytes).

IEEE 802.11be allows the access point to send an MU-RTS frame with different user-specific field values in each 80 MHz channel. A station may not detect from the MU-RTS frame whether it is the only responder of the MU-RTS frame. Moreover, the secondary 80 MHz MU-RTS frame may contain user-information fields only for the SST station(s). The MU-RTS may signal or indicate the type of response frame (CTS or E-CTS). An E-CTS frame may include: frame control, duration, resource allocation, reserved channels (which may indicate unique information for each station), and/or a frame check sum (FCS). Note that: some or all responding stations may use the same frame type; some or all CTS frames may have the same format (as specified in IEEE 802.11ax for an MU-RTS frame); the CTS frame may be transmitted if multiple stations respond on the same channel or if a HE station responds. An E-CTS frame may signal or indicate per the 20 MHz channels in which channel the E-CTS was transmitted. Furthermore, an access point can command a station to set a reserved channels field as reserved.

Figure 26:
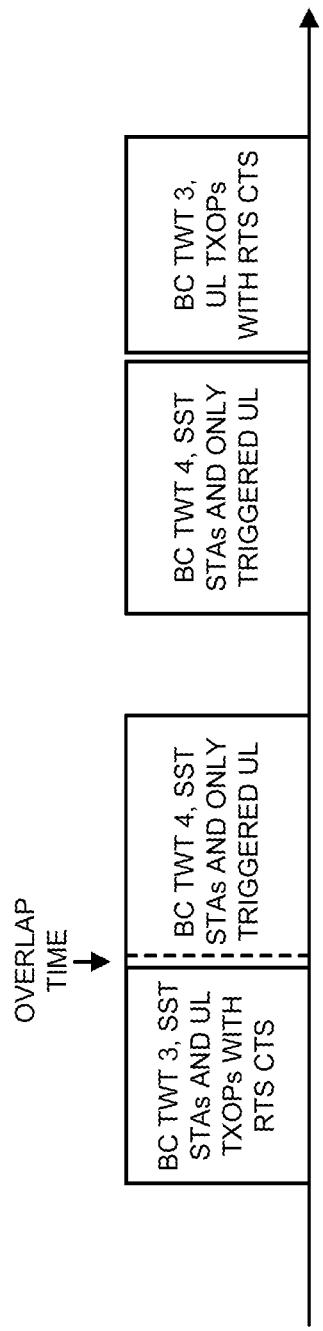
FIG. 26 illustrates an example of broadcast targeted wake-up time (TWT) flows according to some embodiments of the disclosure.

As shown in FIG. 26, which presents an example of broadcast TWT flows, the AP may signal the operating times when DL transmissions to SST stations without transmitting on the primary channel are allowed. The associated stations may detect that the access point may not be available at these times, even if they see the primary channel idle. During these times, the access point may require additional operations from the associated stations. For example, the associated stations on the primary channel may be required to receive RTS frames and transmit CTS frames before they transmit frames. If they do not receive a CTS frame during this time, the stations may not be expected to lower their transmission rate. Moreover, the associated stations on the primary channel may be required to use triggered access, e.g., stations may not be allowed to transmit UL with EDCA during this time. The access point may trigger transmissions from the stations. Furthermore, the access point may have a good opportunity to obtain a TXOP on all channels. Note that, if TWT SPs overlap, then the strictest channel access requirements may be in use during the overlap time, e.g., only triggered access may be used. Additionally, if stations are capable of receiving on more than two channels, they may be recommended to monitor the packet detection channels of the SST stations.

Moreover, instead of using scheduled SST operation, the signaling may be implemented using a broadcast TWT or restricted TWT. A broadcast TWT or a restricted TWT may be similar to an individual TWT (which may be conveyed or set up using a management frame). Both may have setup signaling and may define the operating time when the transmissions may be provided. The access point may transmit broadcast TWT flows or restricted TWT flows, e.g., ongoing SP schedules, in beacons and/or probe responses. Stations may detect the ongoing TWT flows and may check whether the SP schedules have been modified.

Note that a TWT flow type may be identified by a TWT identifier (ID) that specifies the expected operation and exchanges during the TWT flow. SST flows may have a new TWT ID. Moreover, a new bit may be included to signal the times when stations use RTS-CTS signaling prior to their transmission to the access point. Furthermore, a broadcast TWT may have multiple SST stations operating with different packet detection channels. The packet detection channels may be signaled in the broadcast TWT. Stations may determine the likely bandwidth of access-point transmissions during the broadcast TWT SP. Note that the TWT SPs may overlap.

The broadcast TWT signaling may indicate that stations may need to terminate their TXOPs before the start time of the TWT SP. This allows the access point to have an empty channel at the time when it has a TWT SP scheduled to serve SST stations and the access point has better chances to obtain a TXOP to transmit to the SST stations.

Furthermore, the access-point beacons may signal that transmissions to SST stations may occur at any time. For example, an SST station may have low latency traffic and an access point may need to send it at any time.

In some embodiments, stations may request individual or broadcast TWT flow operation. The access point may allow individual TWT set up or may set up a broadcast TWT flow. Moreover, the access point may set up a broadcast TWT flow or restricted TWT flow to protect SST stations operating in individual TWT Flows. The broadcast TWT or restricted TWT may signal the operating requirements for the duration of the individual TWT flows.

In summary, an EHT SST station may be capable to be able to respond to an MU-RTS frame. This capability may simplify access-point operation, especially in large bandwidth PPDU transmissions. In some embodiments, the access-point transmissions to EHT SST stations may have hidden-terminal protection via MU-RTS and MU-CTS frames.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 7 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 27 presents a block diagram of an electronic device 2700 (which may be a cellular telephone, a smartwatch, an access point, a wireless speaker, an IoT device, another electronic device, etc.) in accordance with some embodiments. This electronic device includes processing subsystem 2710, memory subsystem 2712 and networking subsystem 2714. Processing subsystem 2710 includes one or more devices configured to perform computational operations. For example, processing subsystem 2710 can include one or more microprocessors, application-specific integrated circuits (ASICs), microcontrollers, graphics processing units (GPUs), programmable-logic devices, and/or one or more digital signal processors (DSPs).

Memory subsystem 2712 includes one or more devices for storing data and/or instructions for processing subsystem 2710, and/or networking subsystem 2714. For example, memory subsystem 2712 can include dynamic random access memory (DRAM), static random access memory (SRAM), a read-only memory (ROM), flash memory, and/or other types of memory. In some embodiments, instructions for processing subsystem 2710 in memory subsystem 2712 include: program instructions or sets of instructions (such as program instructions 2722 or operating system 2724), which may be executed by processing subsystem 2710. For example, a ROM can store programs, utilities or processes to be executed in a non-volatile manner, and DRAM can provide volatile data storage, and may store instructions related to the operation of electronic device 2700. Note that the one or more computer programs may constitute a computer-program mechanism, a computer-readable storage medium or software. Moreover, instructions in the various modules in memory subsystem 2712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2710. In some embodiments, the one or more computer programs are distributed over a network-coupled computer system so that the one or more computer programs are stored and executed in a distributed manner.

In addition, memory subsystem 2712 can include mechanisms for controlling access to the memory. In some embodiments, memory subsystem 2712 includes a memory hierarchy that comprises one or more caches coupled to a memory in electronic device 2700. In some of these embodiments, one or more of the caches is located in processing subsystem 2710.

In some embodiments, memory subsystem 2712 is coupled to one or more high-capacity mass-storage devices (not shown). For example, memory subsystem 2712 can be coupled to a magnetic or optical drive, a solid-state drive, or another type of mass-storage device. In these embodiments, memory subsystem 2712 can be used by electronic device 2700 as fast-access storage for often-used data, while the mass-storage device is used to store less frequently used data.

Networking subsystem 2714 includes one or more devices configured to couple to and communicate on a wired and/or wireless network (i.e., to perform network operations), such as: control logic 2716, one or more interface circuits 2718 and a set of antennas 2720 (or antenna elements) in an adaptive array that can be selectively turned on and/or off by control logic 2716 to create a variety of optional antenna patterns or 'beam patterns.' Alternatively, instead of the set of antennas, in some embodiments electronic device 2700 includes one or more nodes 2708, e.g., a pad or a connector, which can be coupled to the set of antennas 2720. Thus, electronic device 2700 may or may not include the set of antennas 2720. For example, networking subsystem 2714 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fix networking system), an Ethernet networking system, and/or another networking system.

In some embodiments, networking subsystem 2714 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 2714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2700 may use the mechanisms in networking subsystem 2714 for performing simple wireless communication between the electronic devices, e.g., transmitting advertising or frame frames and/or scanning for advertising frames transmitted by other electronic devices.

Within electronic device 2700, processing subsystem 2710, memory subsystem 2712 and networking subsystem 2714 are coupled together using bus 2728 that facilitates data transfer between these components. Bus 2728 may include an electrical, optical, and/or electro-optical connection that the subsystems can use to communicate commands and data among one another. Although only one bus 2728 is shown for clarity, different embodiments can include a different number or configuration of electrical, optical, and/or electro-optical connections among the subsystems.

In some embodiments, electronic device 2700 includes a display subsystem 2726 for displaying information on a display, which may include a display driver and the display, such as a liquid-crystal display, a multi-touch touchscreen, etc. Display subsystem 2726 may be controlled by processing subsystem 2710 to display information to a user (e.g., information relating to incoming, outgoing, or an active communication session).

Electronic device 2700 can also include a user-input subsystem 2730 that allows a user of the electronic device 2700 to interact with electronic device 2700. For example, user-input subsystem 2730 can take a variety of forms, such as: a button, keypad, dial, touch screen, audio input interface, visual/image capture input interface, input in the form of sensor data, etc.

Electronic device 2700 can be (or can be included in) any electronic device with at least one network interface. For example, electronic device 2700 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 2700, in alternative embodiments, different components and/or subsystems may be present in electronic device 2700. For example, electronic device 2700 may include one or more additional processing subsystems, memory subsystems, networking subsystems, and/or display subsystems. Additionally, one or more of the subsystems may not be present in electronic device 2700. Moreover, in some embodiments, electronic device 2700 may include one or more additional subsystems that are not shown in FIG. 27. In some embodiments, electronic device may include an analysis subsystem that performs at least some of the operations in the communication techniques. Also, although separate subsystems are shown in FIG. 27, in some embodiments some or all of a given subsystem or component can be integrated into one or more of the other subsystems or component(s) in electronic device 2700. For example, in some embodiments program instructions 2722 are included in operating system 2724 and/or control logic 2716 is included in the one or more interface circuits 2718.

Moreover, the circuits and components in electronic device 2700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 2714. This integrated circuit may include hardware and/or software mechanisms that are used for transmitting wireless signals from electronic device 2700 and receiving signals at electronic device 2700 from other electronic devices. Aside from the mechanisms herein described, radios are generally known in the art and hence are not described in detail. In general, networking subsystem 2714 and/or the integrated circuit can include any number of radios. Note that the radios in multiple-radio embodiments function in a similar way to the described single-radio embodiments.

In some embodiments, networking subsystem 2714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 2722, operating system 2724 (such as a driver for an interface circuit in networking subsystem 2714) or in firmware in an interface circuit networking subsystem 2714. Alternatively or additionally, at least some of the operations in the communication techniques may be implemented in a physical layer, such as hardware in an interface circuit in networking subsystem 2714. In some embodiments, the communication techniques are implemented, at least in part, in a MAC layer and/or in a physical layer in an interface circuit in networking subsystem 2714.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna node configured to communicatively couple to an antenna; and
   an interface circuit, communicatively coupled to the antenna node, configured to communicate with a second electronic device and a third electronic device, wherein the electronic device is configured to:
   provide, from the interface circuit, a multi-user (MU)-request-to-send (RTS) frame that communicates an RTS in a channel associated with the second electronic device and communicates a second RTS in a second channel associated with the third electronic device, wherein the third electronic device comprises a sub-channel selective transmission (SST) station and the second electronic device comprises a non-SST station; and wherein the MU-RTS comprises one or more user-information fields specific to the third electronic device and excludes the one or more user-information fields for the second electronic device; and
   receive, at the interface circuit, an MU-clear-to-send (CTS) frame comprising a CTS in a third channel associated with the third electronic device, wherein the MU-RTS frame specifies a format type of the CTS frame and the format type comprises a reserved field with station-specific information, and the MU-CTS frame indicates one or more channels used to communicate the MU-CTS frame.

2. The electronic device of claim 1, wherein the channel comprises a primary channel and the second channel comprises a secondary channel; and
   the secondary channel has a bandwidth of 80 MHz.

3. The electronic device of claim 1, wherein the third channel is equal to, or a subset of, the second channel.

4. The electronic device of claim 1, wherein the third channel is different from, and does not overlap, the channel.

5. The electronic device of claim 1, wherein the second channel comprises a packet detection channel associated with the third electronic device, and the third channel comprises a CTS reception channel associated with the electronic device.

6. The electronic device of claim 1, wherein the format type comprises an extended-CTS (E-CTS).

7. The electronic device of claim 1, wherein the electronic device is configured to provide, from the interface circuit, a beacon frame with information specifying a broadcast targeted wake-up time (TWT) with services periods (SPs) associated with at least the third electronic device.

8. The electronic device of claim 7, wherein the information specifies when RTS-CTS signaling is to be used prior to an uplink transmission associated with the third electronic device, or that specifies when the uplink transmission is triggered by the electronic device.

9. The electronic device of claim 1, wherein the MU-CTS frame comprises a channel indicator that indicates the one or more channels.

10. A method for providing a multi-user (MU)-request-to-send (RTS) frame, comprising:
by an electronic device:
providing the MU-RTS frame, communicating an RTS in a channel associated with a second electronic device and communicating a second RTS in a second channel associated with a third electronic device, wherein the third electronic device comprises a sub-channel selective transmission (SST) station and the second electronic device comprises a non-SST station; and wherein the MU-RTS comprises one or more user-information fields specific to the third electronic device and excludes the one or more user-information fields for the second electronic device; and
receiving an MU-clear-to-send (CTS) frame comprising a CTS in a third channel associated with the third electronic device, wherein the MU-RTS frame specifies a format type of the CTS frame and the format type comprises a reserved field with station-specific information, and the MU-CTS frame indicates one or more channels used to communicate the MU-CTS frame.

11. The method of claim 10, wherein the channel comprises a primary channel and the second channel comprises a secondary channel; and
the secondary channel has a bandwidth of 80 MHZ.

12. The method of claim 10, wherein the information specifies when RTS-CTS signaling is to be used prior to an uplink transmission associated with the third electronic device, or that specifies when the uplink transmission is triggered by the electronic device.

13. The method of claim 10, wherein the third channel is different from, and does not overlap, the channel.

14. The method of claim 10, wherein the second channel comprises a packet detection channel associated with the third electronic device, and the third channel comprises a CTS reception channel associated with the electronic device.

15. An electronic device, comprising:
an interface circuit, communicatively coupled to an antenna node, configured to allow the electronic device to communicate with a second electronic device, wherein the electronic device is configured to:
receive, at the interface circuit in a channel associated with the electronic device, a request-to-send (RTS) in a multi-user (MU)-request-to-send (RTS) frame, wherein the MU-RTS frame is associated with the second electronic device and communicates a second RTS in a second channel associated with a third electronic device, and wherein the electronic device comprises a sub-channel selective transmission (SST) station and the third electronic device comprises a non-SST station; and wherein the MU-RTS comprises one or more user-information fields specific to the third electronic device and excludes the one or more user-information fields for the second electronic device; and
provide, from the interface circuit, a clear-to-send (CTS) in an MU-CTS frame in a third channel associated with the electronic device, wherein the MU-RTS frame specifies a format type of the CTS frame and the format type comprises a reserved field with station-specific information, and the MU-CTS frame indicates one or more channels used to communicate the MU-CTS frame.

16. The electronic device of claim 15, wherein the second channel comprises a primary channel and the channel comprises a secondary channel; and
the secondary channel has a bandwidth of 80 MHZ.

17. The electronic device of claim 15, wherein the third channel is equal to, or a subset of, the channel.

18. The electronic device of claim 15, wherein the third channel is different from, and does not overlap, the second channel.

19. The electronic device of claim 15, wherein the third channel comprises a CTS reception channel associated with the electronic device.

20. The electronic device of claim 15, wherein the electronic device is configured to receive, at the interface circuit, a beacon frame associated with the second electronic device that comprises information specifying a broadcast targeted wake-up time (TWT) with services periods (SPs) associated with the electronic device.

21. The electronic device of claim 20, wherein the information specifies when RTS-CTS signaling is to be used prior to an uplink transmission by the electronic device, or that specifies when the uplink transmission is triggered by the second electronic device.

* * * * *